United States Patent [19]

Bartoe, Jr.

[11] 4,043,523

[45] Aug. 23, 1977

[54] APPARATUS FOR AIRCRAFT PITCH TRIM

[75] Inventor: Otto E. Bartoe, Jr., Boulder, Colo.

[73] Assignee: Ball Brothers Research Corporation, Boulder, Colo.

[21] Appl. No.: 665,833

[22] Filed: Mar. 11, 1976

[51] Int. Cl.$^2$ .................. B64C 13/30; B64C 9/10
[52] U.S. Cl. .................................. 244/87; 244/83 J
[58] Field of Search ................... 244/87, 89, 83 J

[56] References Cited

U.S. PATENT DOCUMENTS 3,207,458   9/1965   Kean .................................. 244/87

Primary Examiner—Trygve M. Blix
Assistant Examiner—Barry L. Kelmachter
Attorney, Agent, or Firm—O'Rourke, Harris & Hill

[57] ABSTRACT

Apparatus for providing extreme pitch trim configurations for aircraft capable of flying at low-speeds, and particularly aircraft having blown primary lift-producing surfaces. The apparatus includes a movable horizontal stabilizer to provide pitch trim and an elevator pivotally attached to the horizontal stabilizer to provide transient pitch control. Control of the elevator movement is provided by a control tube extending from a horn attached to the elevator to a bell crank member attached to the horizontal stabilizer. The bell crank is also connected to a push tube movably attached to the airframe and arranged to be aligned with the pivot axis of the horizontal stabilizer in the neutral position. Thus, the horizontal stabilizer may be pivoted around its mounting axis to provide substantial pitch trim while concurrently maintaining the range and symmetry of elevator movement.

4 Claims, 2 Drawing Figures

APPARATUS FOR AIRCRAFT PITCH TRIM

BACKGROUND OF THE INVENTION

1. Field of the Invention.

The present invention relates generally to a pitch trim and control apparatus and method, and more particularly to a method and apparatus for providing full elevator travel in a system which uses a movable horizontal stabilizer having an extreme range of movement.

2. Description of the Prior Art.

Aircraft pitch trim per se has been recognized for many years. As is well known, the flight characteristics of an aircraft vary according to speed, power setting, etc. Accordingly, it has been the practice to provide trim mechanisms to, under a given set of conditions, afford neutral forces on the pilot's controls. As the operating parameters are altered, the trim mechanisms may be also altered to compensate and again provide the desired, neutral control forces.

Examples of such conventional trim mechanisms are to be found in U.S. Pat. No. 2,094,488 issued Sept. 28, 1937; U.S. Pat. No. 3,207,458 issued Sept. 21, 1965; and U.S. Pat. No. 3.109,614 issued Nov. 5, 1963.

A conventional mechanism for pitch trim comprises a horizontal stabilizer member pivoted around an axis transverse to the airplane fuselage for, nominally, vertical movement. Transient pitch control is provided by an elevator member pivotally attached along an axis parallel to the axis of rotation of the horizontal stabilizer and movable up and down for desired pitch attitude corrections inputs. As illustrated by the above mentioned patents, it has been recognized for some time that pitch trim inputs to the horizontal stabilizer effect the relationship of the elevator relative to the horizontal stabilizer and, accordingly, require compensation.

Another factor of concern is the unusual conditions attendant to a slow flying aircraft, such as a STOL aircraft, in which lift may be augmented by means other than the velocity of the aircraft through the ambient air. For instance, upper wing surface blowing or externally blown flaps develop very high lift coefficients at relatively low aircraft velocities. These lift generating means, however, generate large angles of down wash behind the wing. Thus, the velocity of the slip stream inpinging upon the horizontal stabilizer and elevator is at a relatively high angle to the longitudinal axis of the aircraft. Accordingly, to prevent the horizontal stabilizer from stalling, it is necessary to substantially adjust the angle of the horizontal stabilizer relative to the fuselage to that of a relatively high angle. The adjustments in the horizontal stabilizer angle of incidence are substantially greater than the minor trim angles incurred in conventional aircraft. In fact, the adjustments are often so great as to seriously compromise the travel of the elevator as a result of such adjustments. Conventional pitch trim configurations are inappropriate for such extreme setting and for the unusual airflow conditions.

SUMMARY OF THE INVENTION

The present invention, which provides a heretofore unavailable improvement over elevator compensating apparatus and method of operation, comprises a horizontal stabilizer and means for activating the horizontal stabilizer through substantial changes in angles of incidence relative to the aircraft fuselage while maintaining substantially full elevator movement in both directions at the extremes of the horizontal stabilizer trim movements.

Accordingly, an object of the present invention is to provide a new and improved apparatus and method for providing substantial changes in the trim setting of the horizontal stabilizer while maintaining substantially full travel of the elevator attached to the horizontal stabilizer.

These and other objects and features of the present invention will become apparent from the following description.

DETAILED DESCRIPTION OF THE INVENTION

Figure 1:
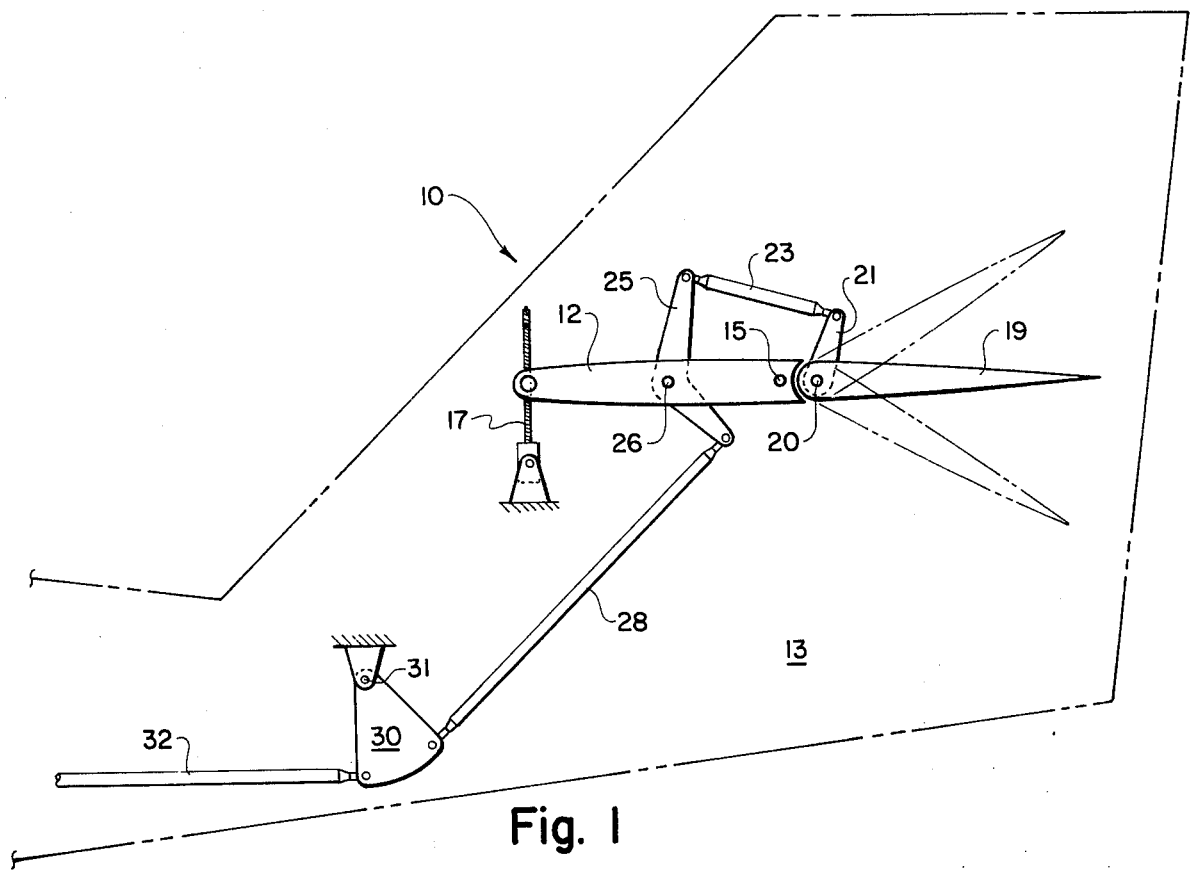
FIG. 1 is a partially schematic representation of a pitch trim compensating apparatus constructed in accordance with the present invention set at a neutral position.
Figure 2:
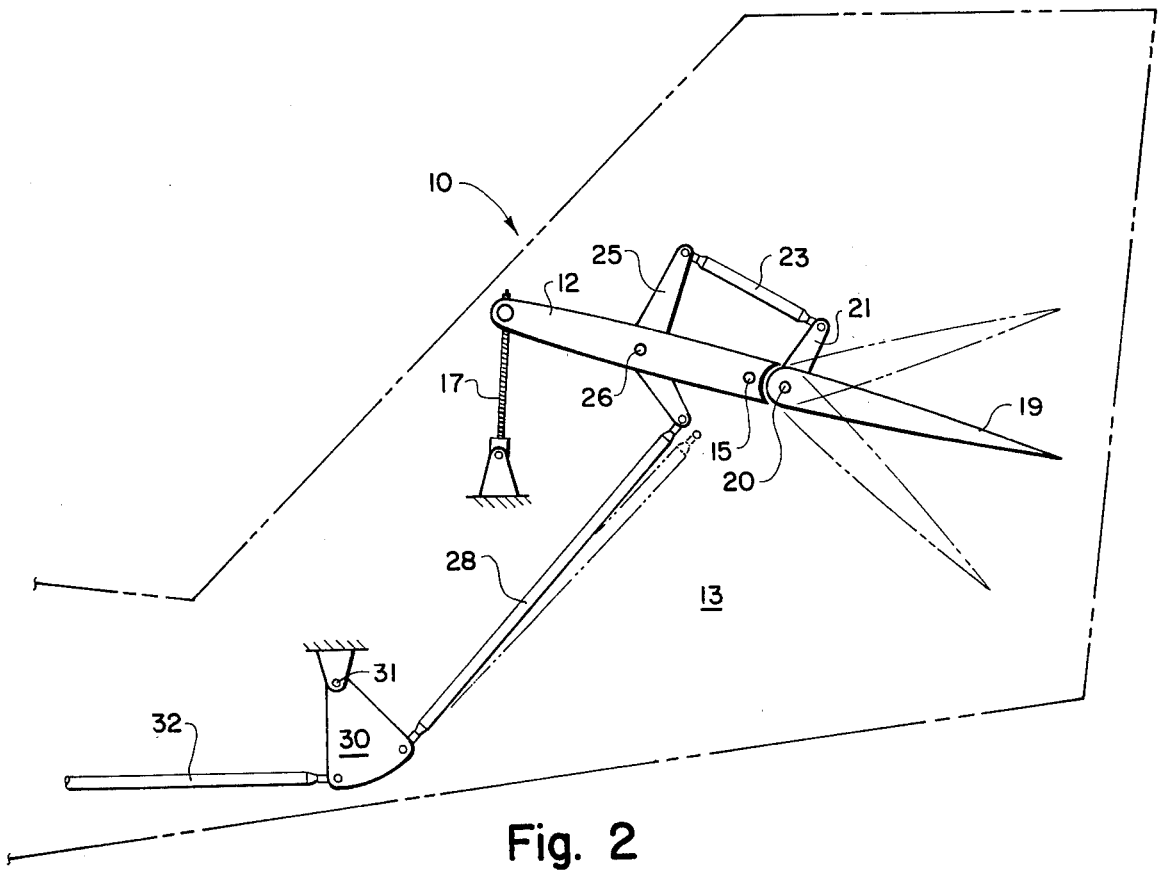
FIG. 2 is a partially schematic representation of a pitch trim compensating apparatus constructed in accordance with the present invention set at a high incidence angle.

Turning now to the drawings, wherein like components are designated by like reference numerals throughout the various figures, a pitch trim control system in accordance with the instant invention is illustrated in FIGS. 1 and 2 generally designated by the reference numeral 10. As will be described in more detail hereinafter, control system 10 includes horizontal stabilizer 12 attached to the aircraft 13 at pivot 15 thereby providing for movement of horizontal stabilizer 12 around pivot 15. Means 17 for moving horizontal stabilizer 12 around pivot 15 are provided and may be, as shown, a jacking means attached to aircraft 13 or, alternatively, hydraulic, pneumatic or other such conventional means for producing translatory movement.

Elevator 19 is carried on horizontal stabilizer 12 and attached thereto by hinge 20. Control horn 21 extends from elevator 19 and, in turn, is connected, sequentially, to control push tube 23, bell crank 25 attached to stabilizer 12 at fulcrum 26, intermediate push tube 28 and then, through pivot member 30 secured to aircraft 13 at attachment point 31, to primary push tube 32.

Primary push tube 32 is connected ultimately to the aircraft control system input (not shown). As shown in FIG. 1, control horn 21 and the portion of bell crank 25 connected to control push tube 23 preferably extend at approximately right angles from elevator 19 and horizontal stabilizer 12, respectfully, when these control surfaces are in the neutral position. As shown in FIG. 2, in slow flight configuration and particularly with artificially augmented airflow over the lifting surfaces, it may be necessary to move horizontal stabilizer 12 to an extreme position by activating means 17 to move horizontal stabilizer 12. Since bell crank 25 is carried on horizontal stabilizer 12, and since pivot member 30 is secured to aircraft 13 at attachment point 31, movement of horizontal stabilizer 12 necessarily influences the setting of elevator 19 relative to aircraft 13. However, and as a critical aspect of the instant invention, by configuring bell crank 25 and pivot member 30 such that intermediate push tube 28 is, as illustrated in FIG. 1, aligned with pivot 15 in the neutral position of horizontal stabilizer 12 and elevator 19, the effect of extreme settings of horizontal stabilizer 12, as shown in FIG. 2, induces only minimal changes in the orientation of elevator 19 relative to horizontal stabilizer 12 while maintaining substantially the entire range of movement of elevator 19 in a symmetrical manner. Push tube 28 is shown in ghosted fashion in FIG. 2 to illustrate the original position of push tube 28 in FIG. 1.

Summarily, as illustrated in the drawings discussed above, the present invention provides a control system and method of changing the control system in which rather substantial pitch trim adjustments may be made by pivoting the horizontal stabilizer around a pivotal connection of the horizontal stabilizer to the aircraft proper. By arranging the intermediate push tube in such a configuration as to be aligned, in the neutral position of the horizontal stabilizer and elevator, with the stabilizer pivot point, both the range of travel and symmetry of travel are maintained between the elevator and horizontal stabilizer. This is of particular importance in low speed flying configurations in which, as a result of reduced airflow speed over the control surfaces, full up and down movements of the elevator may be required.

Although only one embodiment of the present invention has been illustrated and described, it is anticipated that various changes and modifications will be apparent to those skilled in the art, and that such changes may be made without departing from the scope of the invention as defined by the following claims.

What is claimed is:

1. Apparatus for providing pitch trim and pitch control for an aircraft comprising:
    an airframe having a longitudinal axis;
    a horizontal stabilizer pivotally attached to the airframe around an axis transverse to the longitudinal axis of the airframe for movement from a neutral position relative to the airframe to up and down trim positions;
    an elevator pivotally attached to the trailing edge of the horizontal stabilizer for movement from a neutral aligned position relative to the horizontal stabilizer to up and down control positions; a control horn extending from and above the elevator;
    a bell crank pivotally attached to the horizontal stabilizer around an axis substanially parallel to the pivotal axis of the horizontal stabilizer, the bell crank having a first arm extending below the horizontal stabilizer and a second arm extending above the horizontal stabilizer;
    a pivot member rotatably attached to the airframe;
    primary control means connected to the pivot member;
    a push tube extending between the control horn and the second arm of the bell crank, the push tube being pivotally connected to both the bell crank and the control horn;
    an intermediate push tube extending between the pivot member the first arm of the bell crank and substantially longitudinally aligned with the pivot axis of the horizontal stabilizer when the horizontal stabilizer and elevator are both in the neutral position; and
    means for rotating the horizontal stabilizer around the pivot axis of the horizontal stabilizer,
    whereby the horizontal stabilizer may be rotated around its pivot axis to provide pitch trim while maintaining substantially constant orientation of the elevator relative to the horizontal stabilizer at a given setting of the pivot member throughout the movement of the horizontal stabilizer.

2. Apparatus for providing pitch trim as set forth in claim 1 in which the axis around which the horizontal stabilizer is pivotally attached to the airframe is adjacent to but spaced from the pivotal attachment axis of the elevator.

3. Apparatus for providing pitch trim as set forth in claim 1 in which the means for rotating the horizontal stabilizer is attached between the leading edge of the horizontal stabilizer and the airframe.

4. Apparatus for providing pitch trim and control for an aircraft comprising:
    an airframe having a longitudinal axis;
    a horizontal stabilizer pivotally attached to the airframe around an axis transverse to the longitudinal axis of the airframe and adjacent the trailing edge of the horizontal stabilizer, the horizontal stabilizer being mounted to the airframe for movement from a neutral position relative to the airframe to up and down trim positions;
    an elevator pivotally attached to the trailing edge of the horizontal stabilizer for movement from a neutral, aligned position relative to the horizontal stabilizer to up and down control positions;
    a control horn extending substantially at a right angle from the elevator;
    a bell crank pivotally attached to the horizontal stabilizer around an axis substantially parallel to the pivotal axis of the horizontal stabilizer, the bell crank having an arm extending above the horizontal stabilizer which is substantially perpendicular to the horizontal stabilizer when the elevator is in the neutral position, and another arm extending below the horizontal stabilizer;
    a pivot member rotatably attached to the airframe;
    primary control means connected to the pivot member;
    a push tube extending between the control horn and the arm of the bell crank extending above the horizontal stabilizer, the push tube being pivotally connected at the ends thereof to both the bell crank arm and the control horn;
    an intermediate push tube extending between the pivot member and the bell crank arm extending below the horizontal stabilizer and substantially aligned with the pivot axis of the horizontal stabilizer such that an extension of the intermediate push tube would pass through the pivot axis of the horizontal stabilizer when the horizontal stabilizer and elevator are both in the neutral position; and
    means attached between the airframe and the horizontal stabilizer for rotating the horizontal stabilizer around the pivot axis of the horizontal stabilizer.

* * * * *

UNITED STATES PATENT AND TRADEMARK OFFICE
CERTIFICATE OF CORRECTION

PATENT NO. : 4,043,523

DATED : August 23, 1977

INVENTOR(S) : Otto E. Bartoe, Jr.

It is certified that error appears in the above-identified patent and that said Letters Patent are hereby corrected as shown below:

Column 2, line 30 "and2" should be "and 2"
Column 3, line 44 "substanially" should be "substantially"
Column 3, line 58 "member the first" should be "member and the first"

Signed and Sealed this

Twentieth Day of December 1977

[SEAL]

Attest:

RUTH C. MASON
Attesting Officer

LUTRELLE F. PARKER
Acting Commissioner of Patents and Trademarks